March 25, 1924.　　　　　　　1,487,713
B. BUCHER
HOE
Filed Jan. 21, 1922
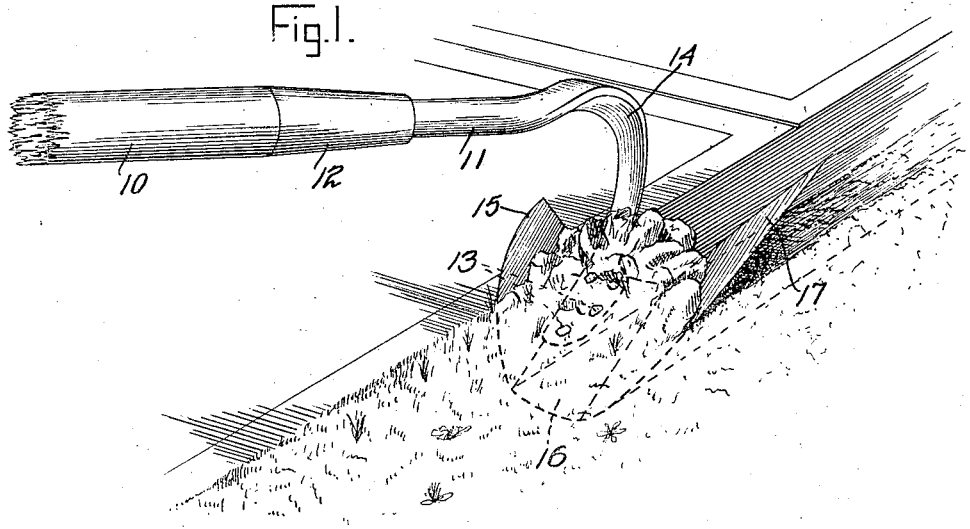
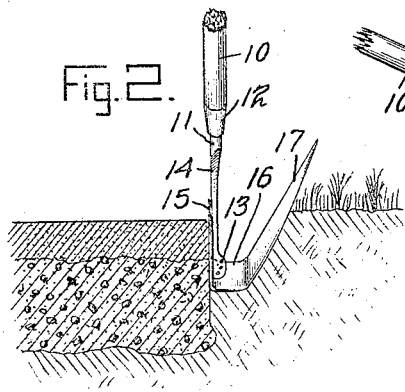 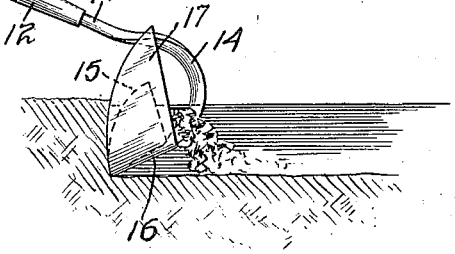
Inventor
Benjamin Bucher
By
Attorney Patented Mar. 25, 1924.

1,487,713

UNITED STATES PATENT OFFICE.

BENJAMIN BUCHER, OF WHITEHOUSE, OHIO.

HOE.

Application filed January 21, 1922. Serial No. 530,905.

*To all whom it may concern:*

Be it known that I, BENJAMIN BUCHER, a citizen of the United States, residing at Whitehouse, in the county of Lucas and State of Ohio, have invented certain new and useful Improvements in Hoes, of which the following is a specification.

My said invention relates to a hoe intended primarily as an edge trimmer for walks and it is an object of the invention to provide a simple and effective device of this sort which can be used for various purposes such as cutting weeds along the edge of a walk or for making gutters, hoeing close around garden plants and for other similar uses.

Referring to the accompanying drawings which are made a part hereof and on which similar reference characters indicate similar parts, Figure 1 is a perspective view of my device in use, Figure 2 a rear view, and Figure 3 a side view of the same.

In the drawings 10 indicates the lower end of a handle to which the shank 11 of the device is attached in ordinary manner by the use of a metallic ring 12. The shank 11 curves downwardly and to the front at its rear end and the extreme end is flattened for attachment as by rivets 13 to the cutting blade. The intermediate part 14 is also flattened at the sides so as to interfere as little as possible with the passage of earth and vegetation and in the present instance is shown as having a cutting edge.

The blade has a vertical portion 15, a bottom 16 at right angles to the part 15 and an inclined side 17. The side 15 is intended to move close alongside a walk or a garden plant or to form the straight side of a trench, the side 17 forming the inclined side of a gutter in cases where the earth is entirely removed for that purpose from the trench formed by the hoe. The front edges of all three parts of the blade are usually formed as sharp cutting edges.

Having thus fully described my said invention, what I claim as new and desire to secure by Letters Patent, is:—

1. A hoe comprising a blade formed with a bottom member and a side member bent upwardly from the bottom member both of said members having a forward cutting edge, and a handle having a shank fastened to the bottom member and bent upwardly and forwardly therefrom, the said bent portion of the shank lying substantially in the same plane with the said side member and having a cutting edge formed on the forward edge thereof, substantially as set forth.

2. A hoe comprising a bottom member and side cutting member, a handle having a shank secured to the bottom member and bent upwardly and forwardly in substantially the same plane with the side cutting member said shank having a cutting edge, substantially at set forth.

In witness whereof, I have hereunto set my hand and seal at Whitehouse, Ohio, this 19th day of January, A. D. nineteen hundred and twenty-two.

BENJAMIN BUCHER. [L. S.]

Witnesses:
H. C. HOLLIKER,
T. A. BRADLEY.